United States Patent
Bagley

[15] 3,651,557
[45] Mar. 28, 1972

[54] OIL SEAL PULLER

[72] Inventor: Millard Bagley, 6267 Pentz Road, Paradise, Calif. 95960

[22] Filed: Mar. 27, 1970

[21] Appl. No.: 23,361

[52] U.S. Cl.................................................29/260, 29/263
[51] Int. Cl..........................................................B23p 19/04
[58] Field of Search....................29/258, 256, 261, 262, 265, 29/255, 280, 259, 260, 263

[56] References Cited

UNITED STATES PATENTS

| | | | |
|---|---|---|---|
| 2,052,304 | 8/1936 | Kaplan | 29/262 |
| 2,380,068 | 7/1945 | Patton | 29/280 X |
| 1,534,066 | 4/1925 | Larkey | 29/261 |
| 3,304,601 | 2/1967 | Torres | 29/261 |

Primary Examiner—Gil Weidenfeld
Attorney—Lothrop & West

[57] ABSTRACT

A chassis includes a pair of arcuate in section pivoted jaws dimensioned so as to encircle with some clearance the portion of a crankshaft projecting from the block of an internal combustion engine. The ends of the jaws are tapered and serrated so that upon being urged toward the block they are forcefully and securely interposed between the crankshaft and the encircling resilient member of an oil seal. The oil seal is lodged within the customary oil seal well formed in the block where the crankshaft emerges from the block. Thus, when the two jaws are thereafter spread apart with substantial force, and the two adjacent portions of the resilient seal member are deformed radially outwardly, the gripping effort between the serrated jaws and the resilient seal member is so great that the seal can thereafter be moved axially out of its well. Axial movement is effected by rotation of a threaded axial stem having a thrust shoulder bearing against the outer end of the crankshaft, the threaded stem being in threaded engagement with the chassis so as to afford selective relative movement between the chassis and the serrated jaws on the one hand and the outer end of the crankshaft on the other hand.

5 Claims, 5 Drawing Figures

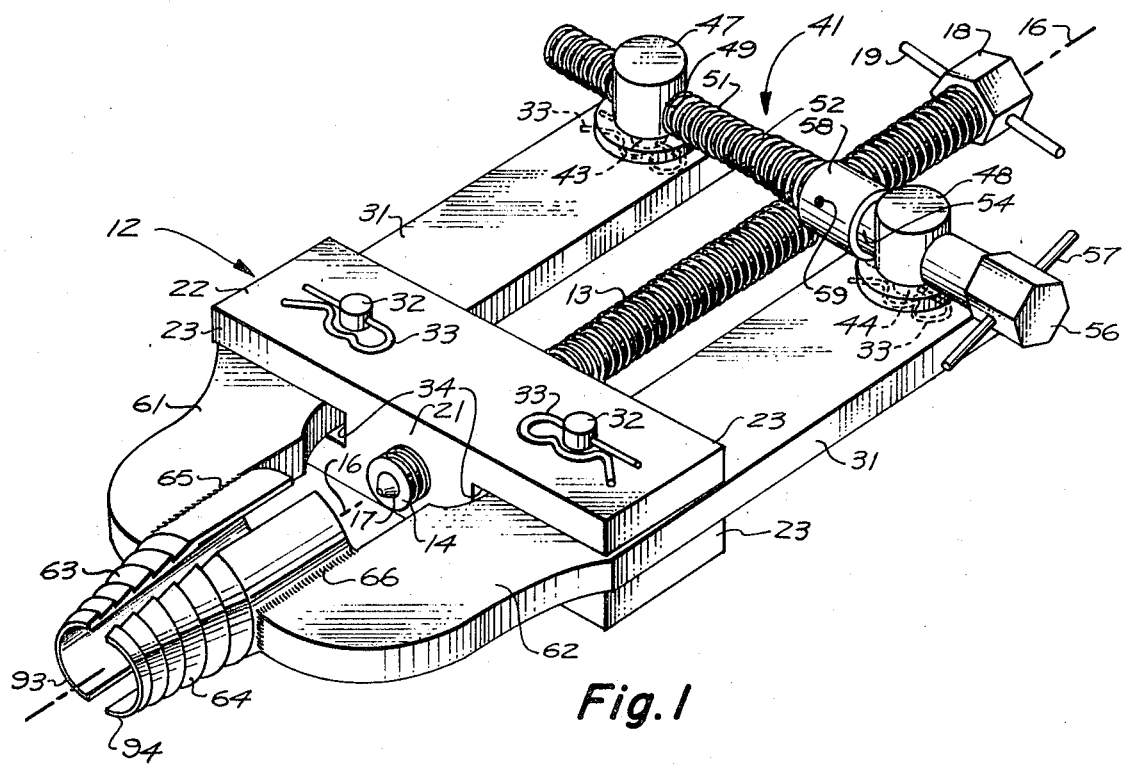
Fig.1
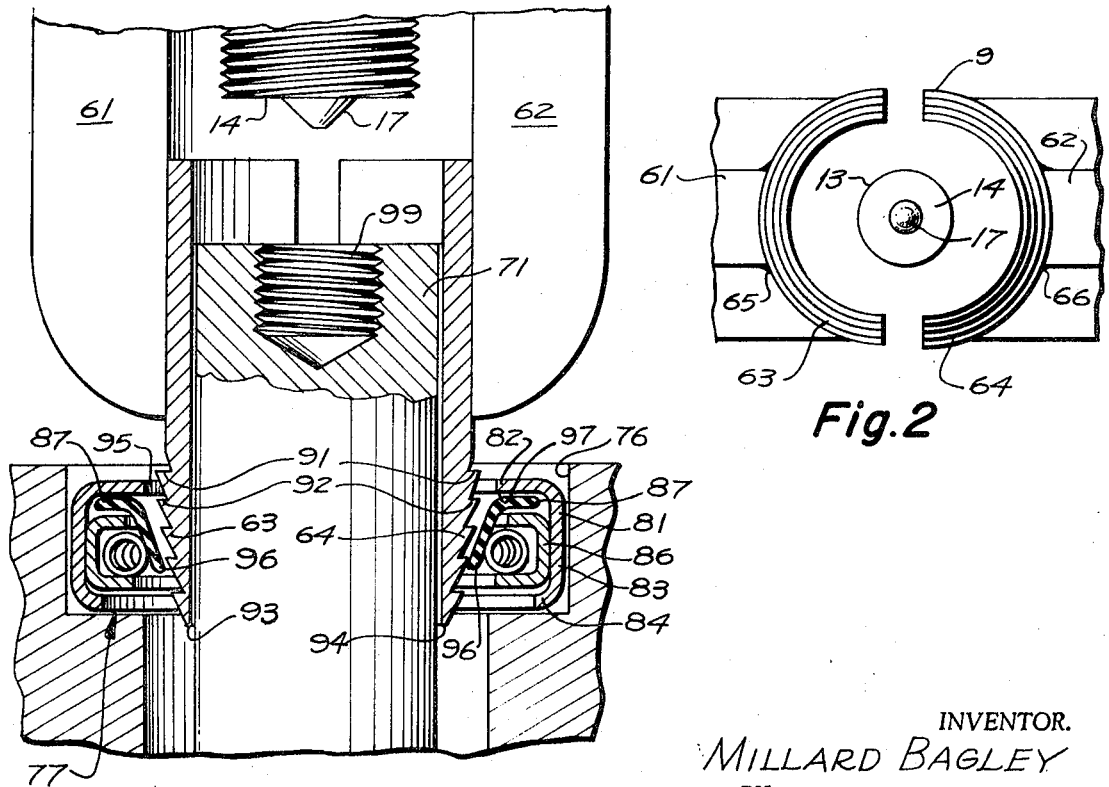
Fig.2
Fig.3
INVENTOR.
MILLARD BAGLEY
BY Lothrop & West
ATTORNEYS INVENTOR.
MILLARD BAGLEY
BY
Lothrop & West
ATTORNEYS

OIL SEAL PULLER

The invention relates generally to improvements in devices for dislodging and removing oil seals from crankshafts and, more particularly to improved oil seal pullers for use in connection with the repair of small internal combustion engines, such as those used in lawnmowers, water pumps and electrical generators, as well as in garden tillers and small tractors.

The prior art, as well as the market place, is replete with apparatus for pulling oil seals and the like, exemplary being R. E. Larkey, U.S. Pat No. 1,534,066 dated Apr. 21, 1925 and H. M. Torres, U.S. Pat. No. 3,304,601 dated Feb. 21, 1967.

The previous devices, however, have failed to afford a sufficient area of engagement between the tool jaws and the seal, with the result that the unit pressure is so great that the operating teeth or lips tear the metal and the resilient seal member without dislodging the seal from its well and removing it from the crankshaft.

The previous devices, furthermore, have been unable to operate where the clearance between the seal and the shaft is smaller than the lateral length of the lifting teeth; and the prior devices have also evidenced a tendency to score the surface of the crankshaft in the vicinity of the oil seal, thereby destroying the sealing capabilities of a seal subsequently installed on the crankshaft.

It is therefore an object of the invention to provide an oil seal puller which operatively engages a major portion of the periphery of the seal and which, therefore, readily effects separation of the seal from the well and from the crankshaft without ripping or tearing small segments of the seal and scoring the shaft.

It is another object of the invention to provide an oil seal puller which is relatively economical and compact in size, yet is capable of being quickly adapted to handle numerous crankshaft diameters and sizes, including installations wherein the clearance between the shaft and the seal is quite small.

It is still another object of the invention to provide an oil seal puller which is rugged and durable, and has but few moving parts to get out of order.

It is a further object of the invention to provide an oil seal puller which can readily and reliably be operated even by unskilled personnel.

It is another object of the invention to provide a generally improved oil seal puller.

Other objects, together with the foregoing, are attained in the embodiment described in the following description and illustrated in the accompanying drawings in which:

FIG. 1 is a front perspective view, showing the jaws in open position;

FIG. 2 is a fragmentary, jaw-end elevational view, to an enlarged scale, showing the jaws in a substantially closed position;

FIG. 3 is a fragmentary, median, longitudinal sectional view, showing a typical crankshaft and oil seal installation on a small gasoline engine of the lawnmower type, and with the jaws inserted between the crankshaft and the resilient oil seal member;

Figure 4:
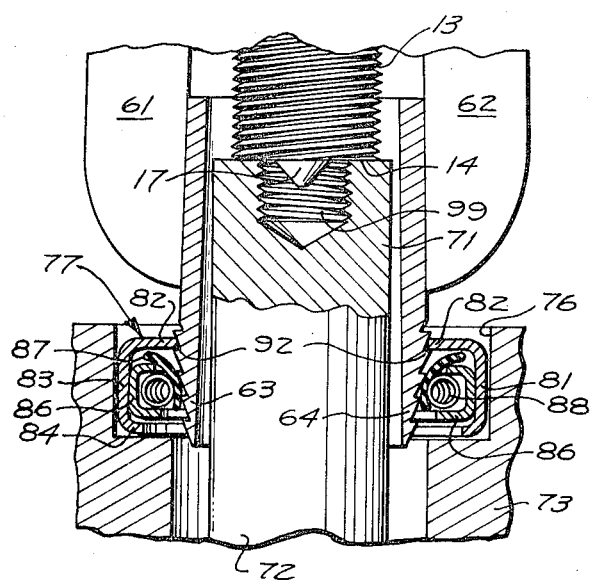
FIG. 4 is a view comparable to Fig. 3, but with the jaws spread apart into deforming relationship with the seal, and with the lifter stem positioned against the outer end of the crankshaft, preparatory to dislodging the seal; and, FIG. 5 is a view comparable to Fig. 4, but showing the relative location of the jaws, seal and stem immediately following separation of the seal from the crankshaft.

While the oil seal puller of the invention is susceptible of numerous physical embodiments, depending upon the environment and requirements of use, substantial numbers of the herein shown and described embodiments have been made, tested and used, and all have performed in an eminently satisfactory manner.

The oil seal puller of the invention, generally designated by the reference numeral 12 comprises an axially oriented threaded stem 13 having on its forward end a planar shoulder 14, the plane being at right angles to the stem axis 16, with a protruding guide tip 17. On its after end the stem 13 carries a torque receiving member, such as a hexagonal in cross section block 18, or the like, capable of being engaged and rotated by a torque producing member, such as a removable cross-pin 19, or a wrench.

The stem 13 is in threaded engagement with the central, body portion 21 of a chassis 22. Projecting laterally from the chassis body 21, in opposite directions, is a pair of chassis arms 23, preferably bifurcated to receive a corresponding pair of jaw spreader arms 31 pivotally mounted by pins 32, and pin retainers 33, for movement within the coplanar slots 34 formed in the transverse chassis arms 23.

In and out movement of the jaw spreader arms 31 is effected by a spreader mechanism, generally designated by the reference numeral 41. The spreader mechanism 41 is supported on the after ends of the jaw spreader arms 31 and includes a pair of pins 43 and 44 mounted on the arms 31 and removably held by pin retainers 33. The upper ends of the pins 43 and 44 carry a pair of blocks 47 and 48, respectively.

The block 47 is drilled and tapped, as at 49, to receive the threaded portion 51 of a transverse spreader shaft 52 spanning the blocks 47 and 48.

The right-hand block 48 (see Fig. 1) is drilled so as to receive the unthreaded portion 54 of the shaft 52 in rotatable manner. Rotation of the spreader shaft 52 is afforded by a head 56 with cross-pin 57. A collar 58, held by a roll pin 59, serves in conjunction with the torque head 56 to obviate translational movement of the shaft 52 relative to the right-hand block 48. Thus, rotation of the head 56 serves, selectively, to move the jaw arms 31 toward and away from each other, thereby effecting corresponding, but opposed movement of the forward ends 61 and 61 of the jaw arms 31.

In other words, by appropriate rotation of the spreader head 56, the spreader mechanism 41 serves to move the forward ends 61 and 62 of the jaw arms 31 toward and away from each other in desired fashion. This movement, in turn, is converted to corresponding movement of the pair of jaws 63 and 64, respectively, mounted on the forward ends of the jaw arms 31 as by respective weldments 65 and 66.

In the jaw position shown in Fig. 1, the jaws 63 and 64 are shown as diverging slightly, this being a convenient disposition for inserting the jaws axially on and over the protruding stub end portion 71 of a crankshaft 72 protruding from an engine block 73. As appears most clearly in Fig. 3-5, the crankshaft 72 extends through a well 76, or recess, formed in the engine block 73, the well serving to lodge a conventional oil seal 77.

In customary fashion, the oil seal 77 includes a metal shell 81 having an outer, annular, shoulder portion 82, side walls 83 and an inturned flange 84 confining a spring housing member 86. A flexible seal 87 is confined within the housing 81, the seal 87 being constricted into oil tight relation with the crankshaft by a toroidal, helically wound spring 88 located within the housing 86.

Figure 5:
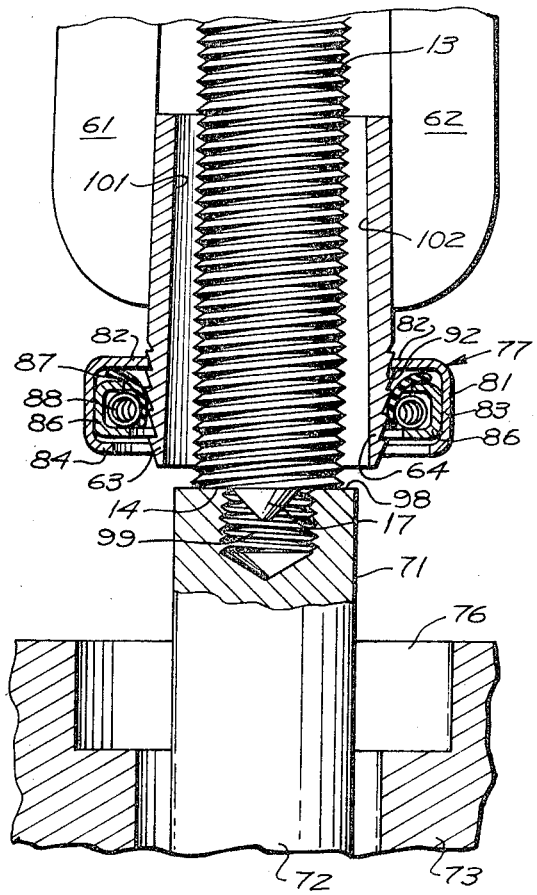

As is most clearly indicated in Figs. 3-5, the forward ends of the jaws 63 and 64 are exteriorly tapered and are threaded, or serrated in parallel tiers so as to afford a plurality of annular ledges 91, 92 etc. of decreasing diameter as the jaw ends 93 and 94 are approached.

Fig. 3 illustrateS a typical arrangement of the components after the jaw ends have been inserted downwardly into and through the annular clearance space 95 between the seal shoulder 82 and the crankshaft 72. Ordinarily, hand pressure is sufficient to wedge the tapered and serrated jaws 63 and 64 far enough so that the depending skirt portion 96 of the oil seal 77 is deformed radially outwardly to some extent, and at least one of the ledges 91, 92 etc. is below the adjacent lower surface 97 of the seal shoulder 82. If more insertion is necessary, a light blow on the stem head 18 will suffice.

At this juncture, the jaws 63 and 64 can be spread apart by appropriate rotation of the spreader mechanism 41. The effect of spreading the jaws is as indicated in Fig. 4 wherein the resilient seal 87 is so distorted and compressed by the jaw teeth against urgency of the spring 88 as to "bite" into the seal material. Concurrently, the adjacent one of the ledges (here, ledge 92) is moved radially outwardly so as to underlie the superposed portion of the metal shoulder 82.

Thus, when the stem 13 is rotated so as to bring the transverse stem shoulder 14 to bear against the annular outer end surface 98 of the crankshaft 72, with the conical guide tip 17 centered in the customary drilled and tapped axial opening 99 in the end of the crankshaft, further torque exerted on the stem 13 is effective to lift the seal out of the well.

That is to say, with the serrated jaws "biting" into the resilient seal with great force, and with a ledge (for example, the jaw ledge 92) underlying the seal shoulder 82 for substantially its entire inner periphery, further downward force exerted by the transverse stem shoulder 14 against the transverse annular end surface 98 of the crankshaft is effective, by reaction, to lift the chassis arms 23, the spreader arms 61 and 62 and the jaws 63 and 64. The jaw lifting force is imparted through the severely distorted resilient seal 87 and the metal shoulder 82 to the oil seal 77 in its entirety.

As a consequence, the oil seal 77 is effectively dislodged from the well 76 and continued rotation of the stem results in lifting the seal clear of the well. Thereafter it is easy to move the entire device lengthwise into the position shown in Fig. 5, since there is ordinarily sufficient clearance between the inner surfaces 101 and 102 of the encompassing jaw members and the underlying surface of the crankshaft 72 so that movement of the seal in a lengthwise direction is accompanied by substantially no rubbing or friction between the seal and the crankshaft. For the same reason, the danger of scoring the crankshaft surface, which exists in many of the prior devices, is substantially eliminated herein.

Upon reaching the position shown in Fig. 5, it is only necessary to back off slightly on the spreader arm mechanism 41 so as to return the jaws to closed position, thereby releasing the resilient seal and the shoulder 82 so that the seal can be removed.

The device is then ready for the next seal pulling operation.

It can therefore be seen that I have provided a compact, yet rugged and efficient oil seal puller that quickly dislodges an oil seal with safety and without scoring the crankshaft.

What is claimed is:

1. An oil seal puller for use in dislodging an oil seal from a crankshaft, said puller comprising:
    a. an elongated threaded stem formed at one end to provide a thrust shoulder at right angles to the axis of said stem and formed at the other end to afford a torque receiving member;
    b. a chassis in threaded engagement with an intermediate portion of said stem for relative axial movement with respect to said stem, said chassis including a central body portion and a pair of laterally extending arm portions;
    c. a pair of jaw arms pivotally mounted on said chassis arm portions, each of said arms having one end located adjacent said thrust shoulder and having the other end located adjacent said other end of said stem;
    d. a pair of opposed, elongated, tapered, serrated jaws mounted on said one end of said pair of jaw arms, said jaws each forming in transverse section an arcuate segment dimensioned to encompass a portion of the crankshaft and engage said seal;
    e. positioning means mounted on and spanning said other ends of said pair of jaw arms for selectively moving said jaws away from each other to engage and deform the resilient member of said oil seal encompassing the crankshaft and said jaws; and,
    f. means for applying torque to said torque receiving member in a direction such as to bring said thrust shoulder to bear against the adjacent end of the crankshaft and to rotate said stem so as to move said jaws and the engaged oil seal in an axial direction away from the oil seal well.

2. An oil seal puller as in claim 1 wherein said torque receiving member is a block capable of being rotated by a wrench.

3. An oil seal puller as in claim 2 wherein said positioning means includes a pair of pins pivotally mounted on said other ends of said jaw arms; a cross-shaft having a threaded portion threadably engaged with one of said pins and an unthreaded portion rotatably mounted on the other of said pins; and means for rotating said cross-shaft to effect movement of said pins toward and away from each other, thereby selectively opening and closing said jaws.

4. An oil seal puller as in claim 1 wherein said tapered, serrated jaws are characterized by a plurality of parallel, annular ledges of converging diameter in a direction approaching the distal ends of said jaws, said ledges being effective to deform the encompassing resilient member of the oil seal and to underlie a nonresilient encompassing shoulder portion of the oil seal as said jaws are spread by said positioning means, the interengaging forces between said puller and said seal being sufficient to dislodge said seal axially from said well as said torque applying means are put into operation.

5. An oil seal puller as in claim 4 wherein said ledges are sufficiently long as to underlie a major fraction of the arcuate length of said shoulder portions.

* * * * *